(12) United States Patent
Shiga et al.

(10) Patent No.: US 7,315,194 B2
(45) Date of Patent: Jan. 1, 2008

(54) BOOSTER CIRCUIT (75) Inventors: Hidehiro Shiga, Kawasaki (JP); Shinichiro Shiratake, Yokohama (JP); Daisaburo Takashima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 10/923,717

(22) Filed: Aug. 24, 2004

(65) Prior Publication Data
US 2005/0275450 A1 Dec. 15, 2005

(30) Foreign Application Priority Data
Jun. 9, 2004 (JP) ............................. 2004-171144

(51) Int. Cl.
*G05F 1/10* (2006.01)
(52) U.S. Cl. .................. 327/535; 327/534; 327/536; 327/537; 327/539; 327/390
(58) Field of Classification Search ...................... None
See application file for complete search history.

(56) References Cited

U.S. PATENT DOCUMENTS

| | | | | |
|---|---|---|---|---|
| 6,459,643 B2 | 10/2002 | Kondo et al. | ............... | 365/226 |
| 6,472,926 B2 * | 10/2002 | Taito et al. | ................. | 327/536 |
| 6,759,866 B2 * | 7/2004 | Mori et al. | ................. | 324/765 |
| 6,812,775 B2 * | 11/2004 | Seo | .............................. | 327/536 |

FOREIGN PATENT DOCUMENTS

| JP | 10-285796 | 10/1998 |
|---|---|---|
| JP | 11-154396 | 6/1999 |
| JP | 2000-40362 | 2/2000 |
| JP | 2000-350439 | 12/2000 |
| JP | 2001-250381 | 9/2001 |

* cited by examiner

*Primary Examiner*—Tuan T. Lam
*Assistant Examiner*—Hiep Nguyen
(74) *Attorney, Agent, or Firm*—Oblon, Spivak, McClelland, Maier & Neustadt, P.C.

(57) ABSTRACT

A booster circuit includes a first booster unit having a first output terminal from which a boosted voltage is output. The first output terminal is connected to an external output terminal. A second booster unit has a second output terminal from which a boosted voltage is output. The second output terminal is connected to the external output terminal. A control circuit outputs a first control signal used to control the operation of the first booster unit and a second control signal used to control the operation of the second booster unit. Further, the control circuit controls the first and second control signals so that a transition between the operative state and the non-operative state of the first booster unit and a transition between the operative state and the non-operative state of the second booster unit will be made at different timings according to output voltage of the external output terminal.

18 Claims, 8 Drawing Sheets

BOOSTER CIRCUIT

CROSS-REFERENCE TO RELATED APPLICATIONS

This application is based upon and claims the benefit of priority from prior Japanese Patent Application No. 2004-171144, filed Jun. 9, 2004, the entire contents of which are incorporated herein by reference.

BACKGROUND OF THE INVENTION

1. Field of the Invention

This invention relates to a booster circuit and more particularly to a pump-type booster circuit.

2. Description of the Related Art

When it is required to use a voltage higher than the power supply voltage in a semiconductor circuit, the required voltage is generally acquired by use of a pump-type booster circuit and a control circuit thereof. A comparator (control circuit) compares the output voltage of the booster circuit with a target voltage, operates the booster circuit if the output voltage is lower than the target voltage and interrupts the operation of the booster circuit if the output voltage is higher than the target voltage. The pump-type booster circuit discharges a preset amount of charge for each pumping operation to repeatedly perform the pumping operation until the target voltage is exceeded. The current driving ability of the booster circuit is generally designed to attain the target output voltage even in a case where the load current is maximum.

In Jpn. Pat. Appln. KOKAI Publication No. 2001-250381, it is disclosed that a plurality of booster circuits having different charge supply abilities are provided and one of the booster circuits is selected and operated according to the operation of a memory circuit which is supplied with the boosted voltage output from the booster circuit. That is, for example, a first booster circuit is operated in synchronism with activation of the precharge signal of the memory circuit and a second booster circuit is operated in synchronism with activation of a word line. U.S. Patent Specification No. 6,459,643B2 corresponds to the U.S. patent specification of the KOKAI publication and has the same contents.

In Jpn. Pat. Appln. KOKAI Publication No. 2000-350439, it is disclosed that a plurality of booster cell groups are provided and the connection state of series connection and parallel connection of the plurality of cell groups is selectively switched according to a control signal from the exterior.

BRIEF SUMMARY OF THE INVENTION

According to a first aspect of the present invention, there is provided a booster circuit comprising: a first booster unit having a first output terminal from which a boosted voltage is output and which is connected to an external output terminal, a second booster unit having a second output terminal from which a boosted voltage is output and which is connected to the external output terminal, and a control circuit which outputs a first control signal used to control an operation of the first booster unit and a second control signal used to control an operation of the second booster unit, the control circuit controlling the first control signal and the second control signal to make a transition between an operative state and a non-operative state of the first booster unit and a transition between an operative state and a non-operative state of the second booster unit at different timings according to an output voltage of the external output terminal.

According to a second aspect of the present invention, there is provided a booster circuit comprising: first to n-th (n is a natural number not smaller than 2) booster units respectively having first to n-th output terminals from which boosted voltages are output, the first to n-th output terminals being connected to an external output terminal, and a control circuit which outputs first to m-th (m is a natural number not smaller than 2 and not larger than n) control signals used to control the operation of at least one of the first to n-th booster units, the control circuit controlling the first to m-th control signals to make transitions between operative states and non-operative states of the first to n-th booster units at different timings according to an output voltage of the external output terminal.

DETAILED DESCRIPTION OF THE INVENTION

Figure 1:
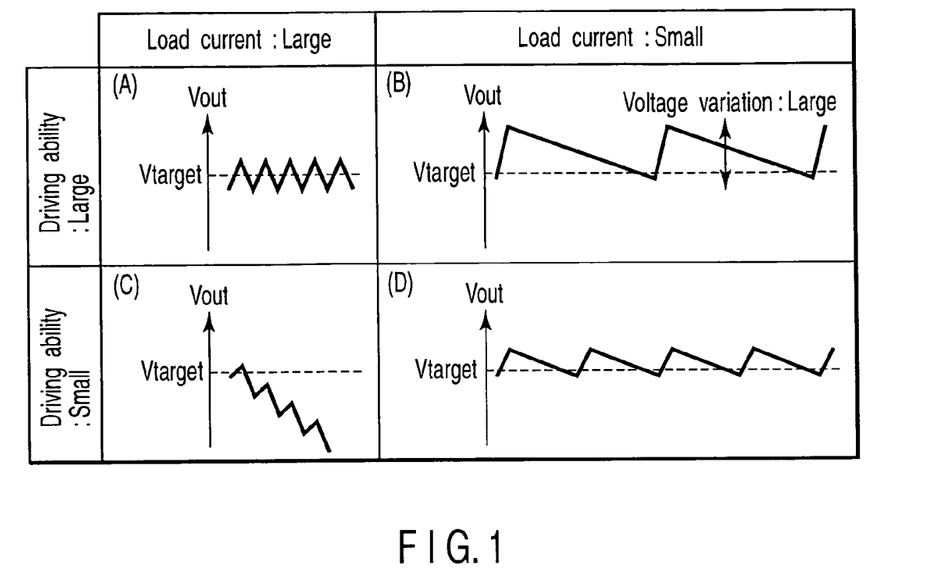
FIG. 1 is a diagram showing output voltages under various conditions.

FIG. 1 is a diagram showing output voltages under various conditions. The current driving ability of the booster circuit is designed to attain a target output voltage even when the load current is maximum. As shown in FIG. 1, the output voltage Vout stays at the target voltage Vtarget and a variation thereof is small when a load current is large (A). However, when the load current becomes smaller in comparison with the maximum load current (B), a variation in the output voltage Vout becomes larger. On the other hand, a small driving ability can suppress a variation in the output voltage Vout to a small value even if the load current is small (D). However, if the load current is large (C), the target voltage Vtarget may not be maintained. If a booster circuit is used in the semiconductor memory, the reliability of the data read and write operations may be lowered according to a variation in the output voltage Vout of the booster circuit. Therefore, it is desired to set the output voltage Vout of the booster circuit with high stability.

There will now be described embodiments of this invention with reference to the accompanying drawings. In the following explanation, the same reference symbols are attached to like constituents having substantially the same function and configuration and the repetitive explanation thereof is made only when necessary.

First Embodiment

Figure 2:
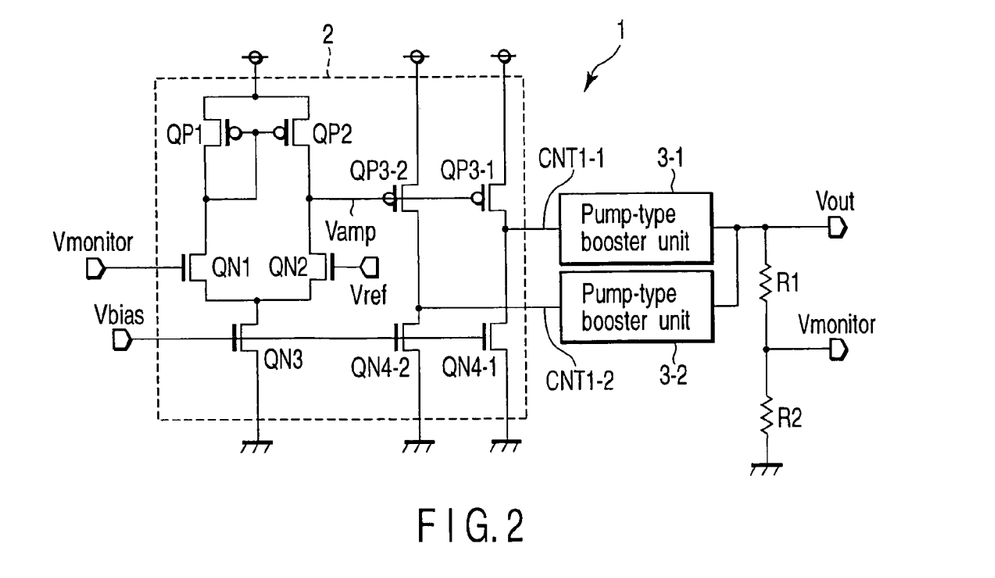
FIG. 2 is a diagram showing the main portion of a booster circuit according to a first embodiment of this invention.
Figure 3:
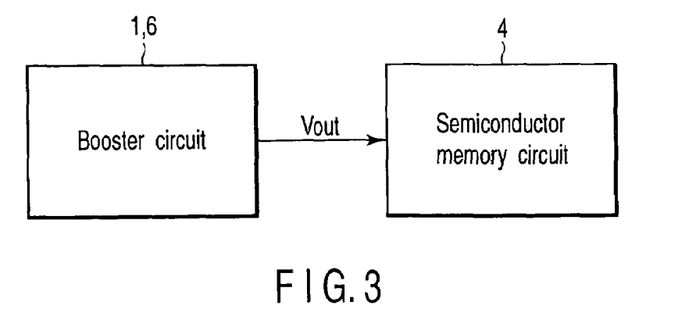
FIG. 3 is a diagram showing an application example of the booster circuit.

FIG. 2 is a diagram showing the main portion of a booster circuit according to a first embodiment of this invention. As shown in FIG. 2, a booster circuit 1 includes a control section 2 and pump-type booster units 3-1, 3-2. The pump-type booster unit 3-1 (first booster unit) and booster unit 3-2 (second booster unit) can be configured by various types of general pump-type booster circuits and generate preset boosted voltages from the power supply voltage. The control section 2 controls the operative and non-operative states of the pump-type booster units 3-1, 3-2 according to a voltage corresponding to the output voltage Vout of the booster circuit 1. The output voltage Vout of the booster circuit 1 is supplied to a semiconductor memory circuit 4 as shown in FIG. 3, for example.

Next, the detailed configuration of each portion of the booster circuit 1 is explained. As shown in FIG. 2, the control section 2 includes a current mirror type differential amplifier circuit. The differential amplifier circuit is supplied with monitor voltage Vmonitor obtained by dividing the output voltage Vout and reference voltage Vref corresponding to desired voltage (target voltage) which is desired to be output from the booster circuit 1. The differential amplifier circuit outputs differential amplification voltage Vamp corresponding to the monitor voltage Vmonitor.

In the differential amplifier circuit, the power supply voltage is applied to one end of a p-type metal oxide semiconductor (MOS) transistor QP1. The other end of the transistor QP1 is connected to the gate thereof and one end of an n-type MOS transistor QN1.

The gate of the transistor QN1 is supplied with the monitor voltage Vmonitor and the other end thereof is grounded via an n-type MOS transistor QN3 as a current source. The gate of the transistor QN3 is supplied with bias voltage Vbias.

One end of a p-type MOS transistor QP2 of the differential amplifier circuit is supplied with the power supply voltage and the gate thereof is connected to the gate of the transistor QP1. The other end of the transistor QP2 is grounded via n-type MOS transistors QN2 and QN3 which are serially connected. The gate of the transistor QN2 is supplied with the reference voltage Vref.

Output voltage Vamp of the differential amplifier circuit is derived from a connection node of the transistors QP2 and QN2. The output voltage Vamp of the differential amplifier circuit is supplied to the gate of a p-type MOS transistor QP3-1. One end of the transistor QP3-1 is supplied with the power supply voltage and the other end thereof is grounded via an n-type MOS transistor QN4-1. The gate of the transistor QN4-1 is supplied with the bias voltage Vbias.

Further, the output voltage Vamp of the differential amplifier circuit is supplied to the gate of a p-type MOS transistor QP3-2. One end of the transistor QP3-2 is supplied with the power supply voltage and the other end thereof is grounded via an n-type MOS transistor QN4-2. The size (current driving ability) of the transistor QP3-1 is larger than that of the transistor QP3-2. The gate of the transistor QN4-2 is supplied with the bias voltage Vbias.

A control signal CNT1-1 (first control signal) is derived from a connection node of the transistors QP3-1 and QN4-1. The control signal CNT1-1 is supplied to the booster unit 3-1. The booster unit 3-1 is operated according to the high level of the control signal CNT1-1.

A control signal CNT1-2 (second control signal) is derived from a connection node of the transistors QP3-2 and QN4-2. The control signal CNT1-2 is supplied to the booster unit 3-2. The booster unit 3-2 is operated according to the high level of the control signal CNT1-2.

The output terminals of the booster units 3-1, 3-2 are connected together and output voltage therefrom is used as the output voltage Vout of the booster circuit. The output voltage Vout is divided by resistor elements R1, R2 which are serially connected and monitor voltage Vmonitor is derived from a connection node of the resistor elements R1 and R2.

Figure 4:
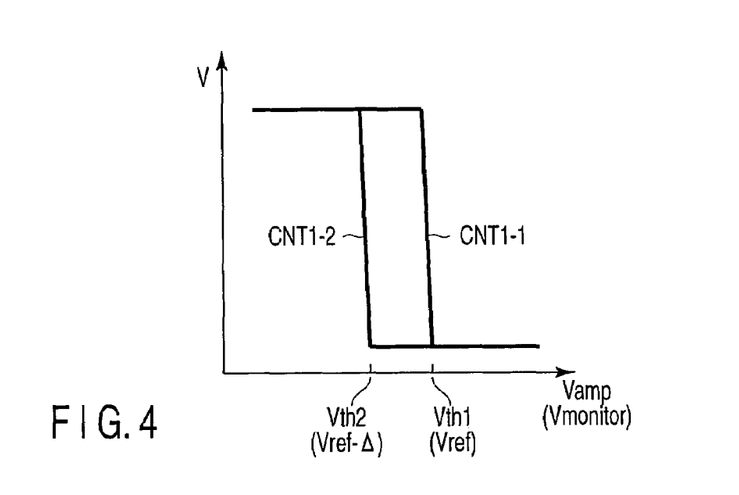
FIG. 4 is a diagram showing the relation between output voltage of a differential amplifier circuit and voltage of a control signal.

Next, the operation of the booster circuit 1 is explained with reference to FIGS. 4 to 6. FIG. 4 shows the relation between the output voltage Vamp of the differential amplifier circuit and voltages V of the control signals CNT1-1, CNT1-2. As described above, the size of the transistor QP3-1 is larger than that of the transistor QP3-2. Therefore, the threshold voltage Vth1 of an inverter configured by the transistors QP3-1 and QN4-1 is set higher than the threshold voltage Vth2 of an inverter configured by the transistors QP3-2 and QN4-2. Thus, as shown in FIG. 4, the control signals CNT1-1, CNT1-2 are different from each other in timing when the high level state and the low level state shift from one to the other according to the output voltage Vamp of the differential amplifier circuit (a variation in the monitor voltage Vmonitor). That is, when the output voltage Vamp of the differential amplifier circuit has reached the threshold voltage Vth1 (when the monitor voltage Vmonitor has reached the voltage Vref), the state of the control signal CNT1-1 is changed. Further, when the output voltage Vamp of the differential amplifier circuit has reached the threshold voltage Vth2 (when the monitor voltage Vmonitor has reached the voltage Vref-Δ), the state of the control signal CNT1-2 is changed.

Figure 5:
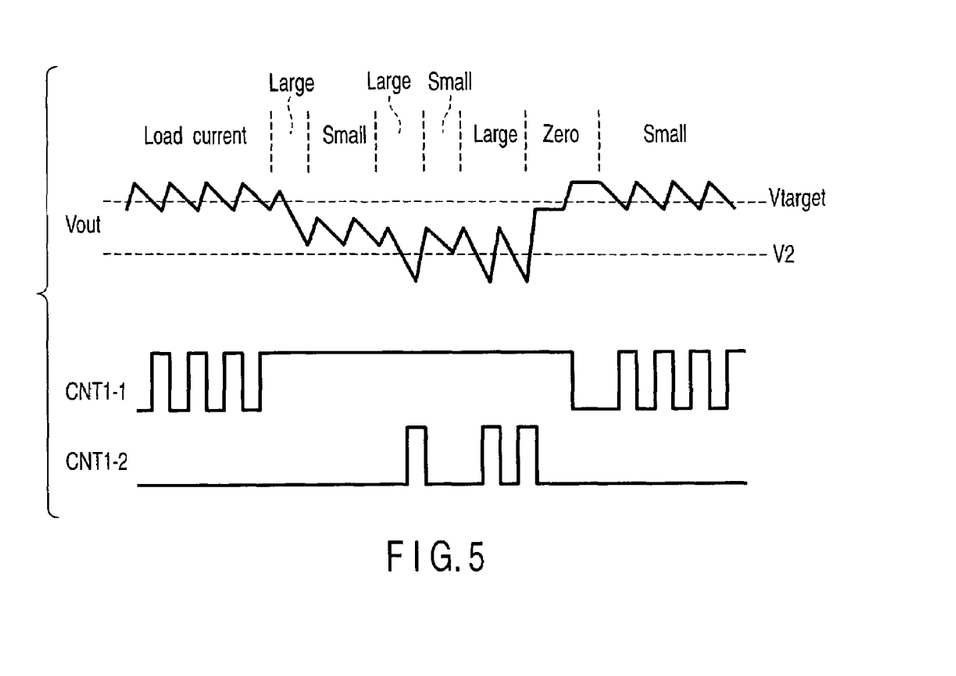
FIG. 5 is a diagram showing the relation between the output voltage and a control signal.
Figure 6:
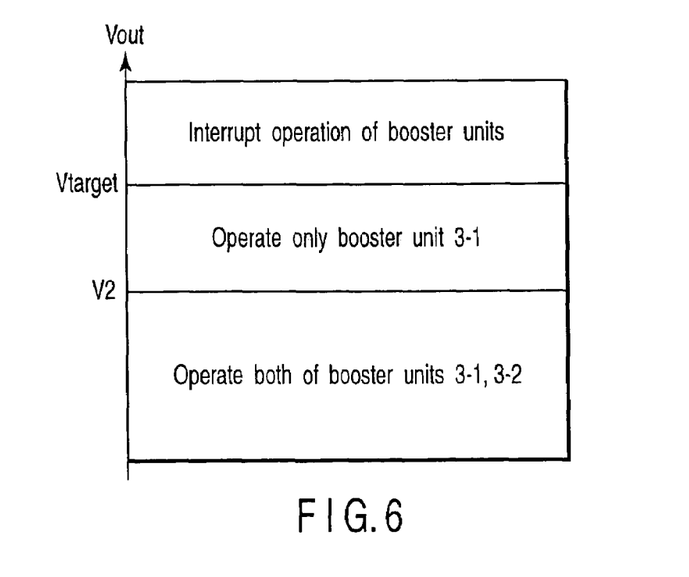
FIG. 6 is a diagram showing the relation between the operation and output voltage of a booster unit.

FIG. 5 is a timing chart showing the relation between the output voltage Vout and the control signals CNT1-1, CNT1-2. FIG. 6 is a diagram showing the relation between the operation and output voltage of the booster unit. As shown in FIGS. 5, 6, when the output voltage Vout exceeds the target voltage Vtarget (when the output voltage Vamp of the differential amplifier circuit exceeds the threshold voltage Vth1), the control signals CNT1-1, CNT1-2 are both at the low level. Therefore, the booster units 3-1, 3-2 are in the non-operative state (the operation thereof is interrupted).

When the output voltage Vout, which exceeds the voltage V2, is lowered and becomes lower than the target voltage Vtarget, only the control signal CNT1-1 changes to the high level. Therefore, the booster unit 3-1 is set into the operative state. If the output voltage Vout exceeds the target voltage Vtarget by one boosting operation by the booster unit 3-1, the control signal CNT1-1 is changed to the low level, thereby setting the booster unit 3-1 into the non-operative state. Each time the output voltage Vout becomes lower than the target voltage Vtarget, the booster unit 3-1 is operated and only the booster unit 3-1 is repeatedly set into the operative state and non-operative state as far as the target voltage Vtarget can be maintained only by the boosting operation of the booster unit 3-1. In this state, the booster unit 3-2 stays in the non-operative state.

In a case where the output voltage Vout does not exceed the target voltage Vtarget only by one boosting operation of the booster unit 3-1, the control signal CNT1-1 stays at the high level and the booster unit 3-1 continuously performs the boosting operation. As a result, when the output voltage Vout exceeds the target voltage Vtarget, the booster unit 3-1 changes into the non-operative state. If the target voltage Vtarget cannot be maintained by continuously operating the booster unit 3-1 and the output voltage Vout is further lowered, output voltage Vout becomes lower than the voltage V2 at a certain time point. The voltage V2 is set so that the output voltage Vamp of the differential amplifier circuit will reach the threshold voltage Vth2 of the inverter configured by the transistors QP3-2 and QN4-2 when the output voltage Vout has reached the voltage V2.

When the output voltage Vout becomes lower than the voltage V2, the control signal CNT1-2 changes to the high level and the booster unit 3-2 performs the boosting operation. At this time, since the control signal CNT1-1 stays at the high level, the booster unit 3-1 continuously performs the operation. On the other hand, when the output voltage Vout exceeds the voltage V2 by single boosting operation of the booster unit 3-2, the booster unit 3-2 is set into the non-operative state. If the output voltage does not exceed the target voltage Vtarget by single boosting operation of the booster unit 3-2, the booster unit 3-2 continuously performs the boosting operation.

When the output voltage Vout exceeds the target voltage Vtarget again, the booster unit 3-1 is set into the non-operative state.

Figure 7:
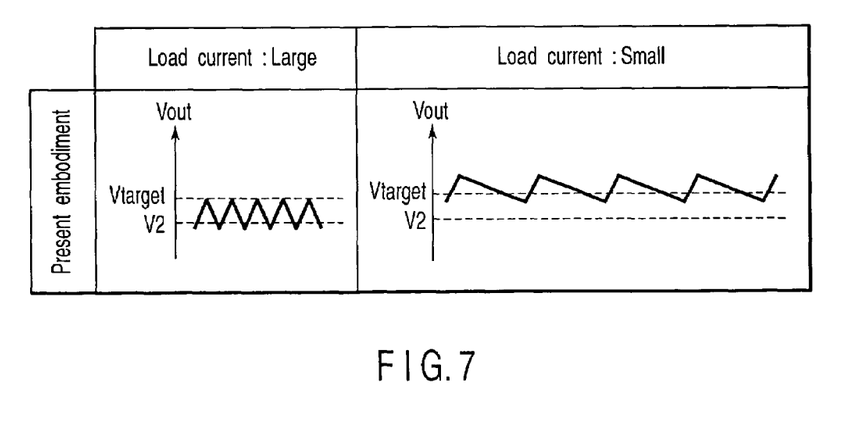
FIG. 7 is a diagram showing output voltage according to a variation in the load current of the booster circuit according to the first embodiment of this invention.

FIG. 7 shows the output voltage Vout according to a variation in the load current of the booster circuit 1 according to the first embodiment. As described above, when the output voltage Vout is lower than voltage V2, the booster units 3-1, 3-2 are both operated. When the output voltage Vout, which exceeds the voltage V2, becomes closer to the target voltage Vtarget, only the booster unit 3-1 is operated. Therefore, as shown in FIG. 7, when the load current is small, a variation in the output voltage Vout can be suppressed to a small value by preventing the booster circuit from being operated with excessively large boosting ability. On the other hand, when the load current is large, the boosting ability is enhanced so as to prevent the output voltage Vout from failing to be maintained at the target voltage Vtarget.

In the booster circuit according to the first embodiment of this invention, the two booster units 3-1, 3-2 which are connected in parallel make transitions between the operative state and non-operative state at different timings according to the output voltage Vout of the booster circuit. Therefore, transitions between the operative state and non-operative state of the booster units 3-1, 3-2 are independently controlled so that the booster units 3-1, 3-2 can be operated in an optimum condition according to the value of the load current of a circuit to which the output voltage Vout is supplied. Thus, it is possible to realize a booster circuit whose variation in the output voltage Vout is small when the load current is small and, at the same time, which can maintain the target voltage Vout when the load current is large.

Figure 8:
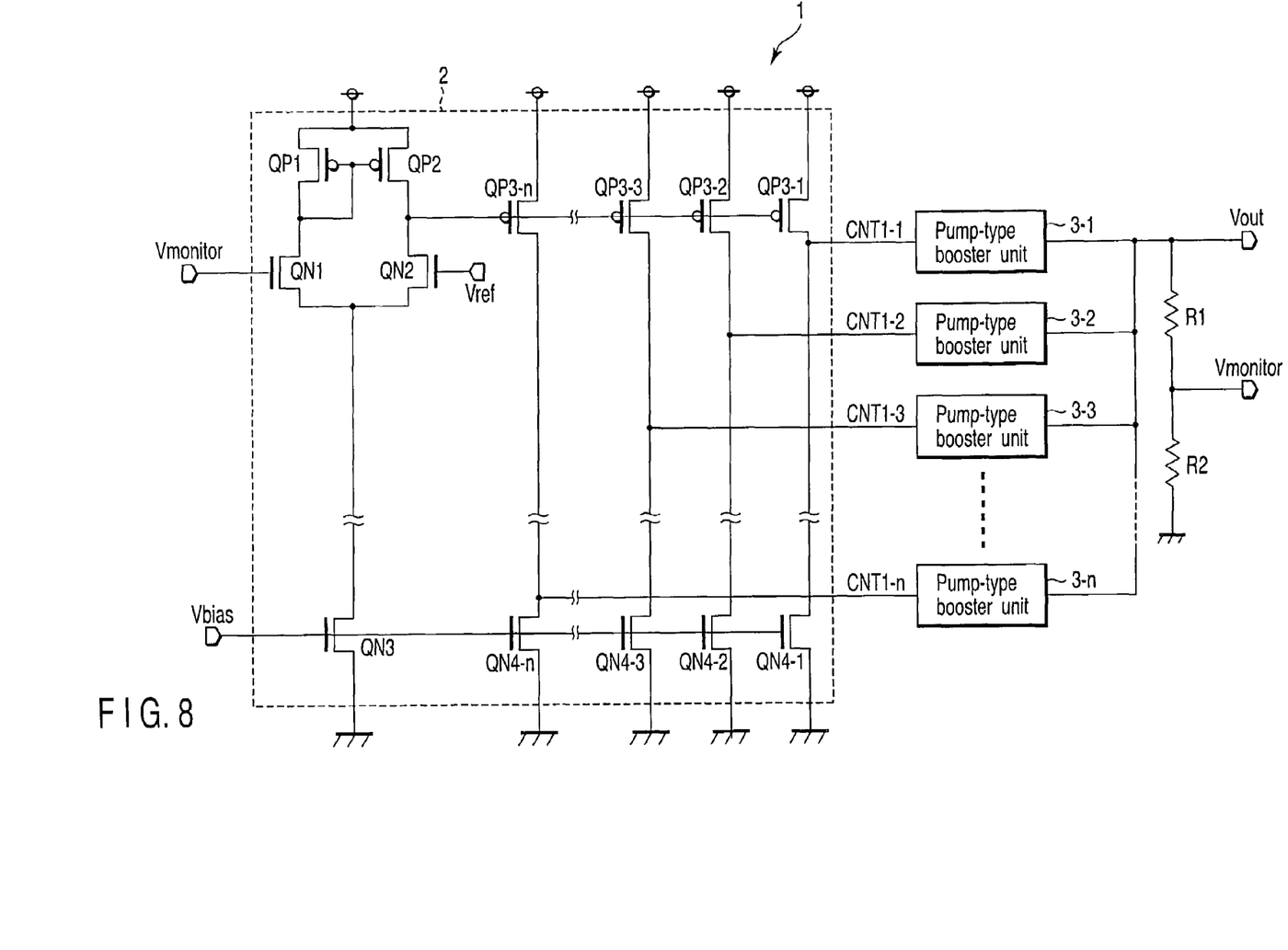
FIG. 8 is a diagram showing the main portion of a booster circuit according to a modification of the first embodiment of this invention.

In the present embodiment, a case where two booster units are used is explained. However, a configuration of three or more booster units can be used. FIG. 8 shows a case where n booster units are provided. As shown in FIG. 8, the output terminals of n booster units 3-1 to 3-n are connected together and voltage from a connection node is used as the output voltage Vout of the booster circuit 1. The control section 2 includes p-type MOS transistors QP3-1 to QP3-n and n-type MOS transistors QN4-1 to QN4-n. Control signals CNT1-1 to CNT1-n are derived from the respective connection nodes of the transistors QP3-1 to QP3-n and transistors QN4-1 to QN4-n. The control signals. CNT1-1 to CNT1-n are respectively supplied to the booster units 3-1 to 3-n. The booster units 3-1 to 3-n perform the boosting operation according to the high levels of the control signals CNT1-1 to CNT1-n.

Timings at which the booster units 3-1 to 3-n transit between the operative state and the non-operative state are made different from one another by configuring the transistors QP3-1 to QP3-n with the sizes which become smaller in the order from the transistor QP3-1 to the transistor QP3-n. Therefore, the booster units 3-1 to 3-n are sequentially and accumulatively set into the operative state with a lowering in the output voltage Vout. On the other hand, the booster units 3-1 to 3-n are sequentially set into the non-operative state in the order from the booster unit 3-n to the booster unit 3-1 with a rise in the output voltage Vout. Also, in this case, each of the booster units 3-1 to 3-n performs the single or continuous boosting operation in the operative state. By the operation as described above, since the boosting ability of the booster circuit 1 is finely set according to the load current, a variation in the output voltage Vout can be suppressed to a small value for each magnitude of the load current.

When three or more booster units are used, two or more booster units can be operated in response to a certain control signal. In this case, the number of sets of the p-type MOS transistor and n-type MOS transistor in the control section 2 is smaller than the number of booster units.

Second Embodiment

In the first embodiment, the timings at which the booster units transit between the operative state and the non-operative state are made different from one another by using a plurality of transistors having different sizes. On the other hand, in the second embodiment, the timings at which the booster units transit between the operative state and the non-operative state are controlled by use of a delay circuit.

Figure 9:
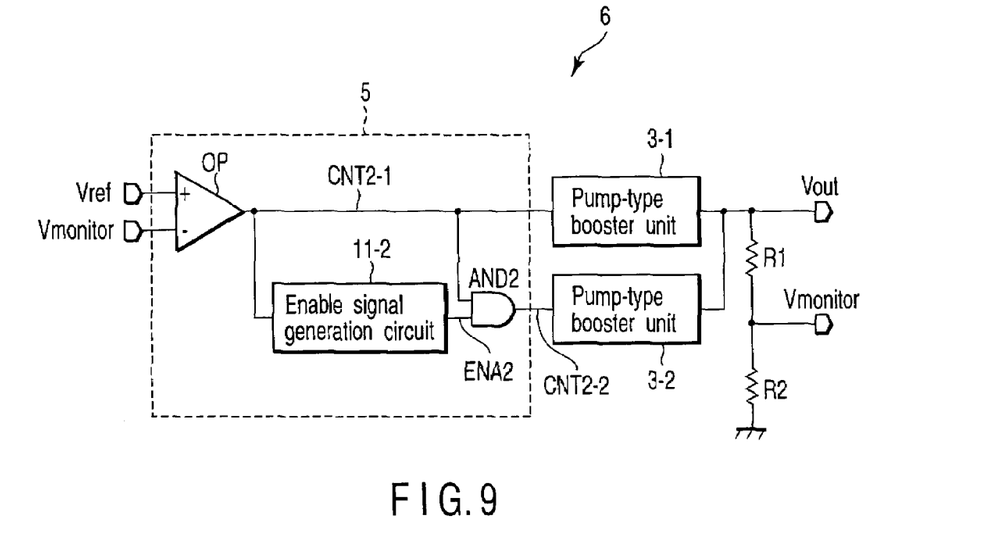
FIG. 9 is a diagram showing the main portion of a booster circuit according to a second embodiment of this invention.

FIG. 9 is a diagram showing the main portion of a booster circuit according to the second embodiment of this invention. As shown in FIG. 9, a control section 5 includes an operational amplifier OP, enable signal generation circuit 11-2 and AND circuit AND2 and generates control signals CNT2-1, CNT2-2 according to output voltage Vout. The control signals CNT2-1, CNT2-2 are respectively supplied to booster units 3-1, 3-2. The booster units 3-1, 3-2 perform the boosting operation in response to the high level of the control signals CNT2-1, CNT2-2.

Reference voltage Vref is also supplied to the non-inverting input terminal of the operational amplifier OP and monitor voltage Vmonitor is supplied to the inverting input terminal thereof. An output of the operational amplifier OP is supplied as the control signal CNT2-1 to the booster unit 3-1. The control signal CNT2-1 is supplied to the enable signal generation circuit 11-2. The enable signal generation circuit 11-2 controls an enable signal ENA2 according to a preset period for which the control signal CNT2-1 stays at the high or low level. The enable signal ENA2 is supplied to the AND circuit AND2. The other input terminal of the AND circuit AND2 is supplied with the control signal CNT2-1. An output of the AND circuit AND2 is supplied to the booster-unit 3-2 as the control signal CNT2-2.

Figure 10:
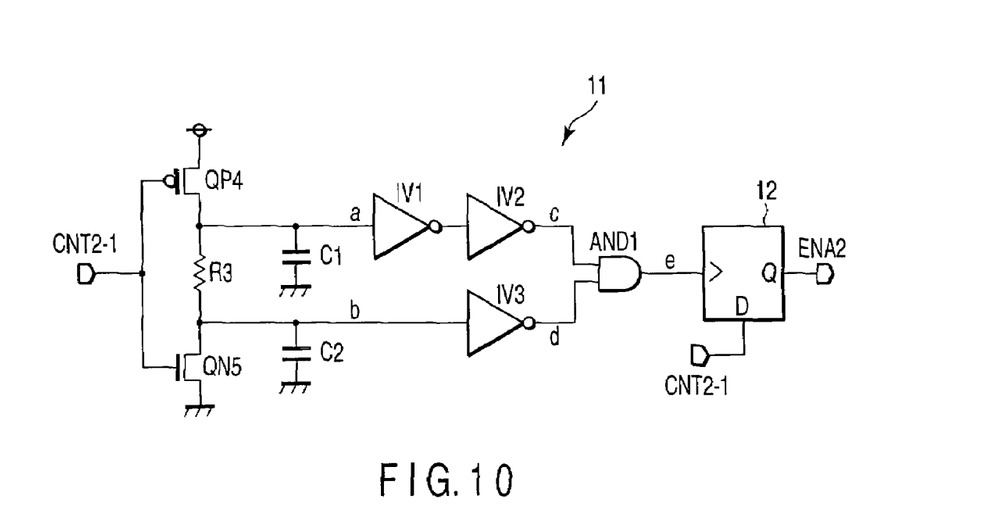
FIG. 10 is a diagram showing the main portion of an enable signal generation circuit.

Next, the enable signal generation circuit 11-2 is explained. FIG. 10 is a diagram showing the main portion of the enable signal generation circuit 11-2. As shown in FIG. 10, the control signal CNT2-1 is supplied to an inverter configured by a p-type MOS transistor QP4, resistor element R3 and n-type MOS transistor QN5 which are serially connected. A connection node of the transistor QP4 and resistor element R3 is grounded via a capacitor C1 and connected to the input terminal of the AND circuit AND1 via inverter circuits IV1, IV2 which are serially connected. A connection node of the resistor element R3 and MOS transistor QN5 is grounded via a capacitor C2 and connected to the other input terminal of the AND circuit AND1 via an inverter circuit IV3.

The output terminal of the AND circuit AND1 is connected to the trigger input terminal of a down-edge trigger type D-type flip-flop circuit 12. A control signal CNT2-1 is supplied to the data input terminal of the D-type flip-flop circuit 12 and an enable signal ENA2 is derived from the data output terminal thereof. The D-type flip-flop circuit 12 latches and outputs data of the data input terminal from the data output terminal when detecting the down edge at the trigger input terminal.

Figure 11:
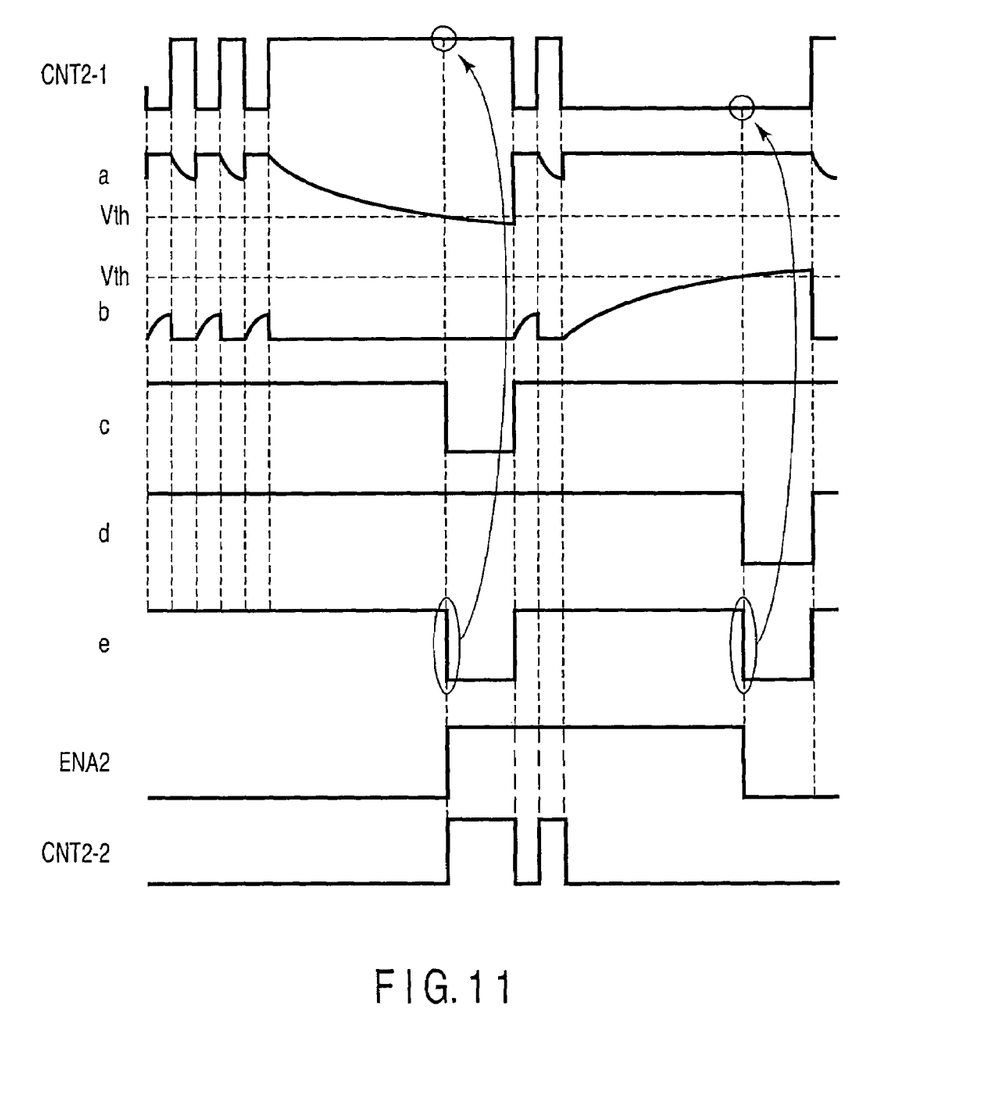
FIG. 11 is a timing chart showing voltage of the main portion of the enable signal generation circuit.

Next, the operation of the enable signal generation circuit 11-2 is explained with reference to FIG. 11. FIG. 11 is a timing chart showing voltages of the main portions of the enable signal generation circuit 11-2. Voltages of the portions "a" to "e" in FIG. 10 correspond to waveforms "a" to "e" shown in FIG. 11. The monitor voltage Vmonitor is compared with the reference voltage Vref and when the monitor voltage Vmonitor exceeds the reference voltage Vref, the control signal CNT2-1 changes to a low level. Further, when the monitor voltage Vmonitor is lower than the reference voltage Vref, the control signal changes to a high level. According to the level of the control signal, the booster unit 3-1 is repeatedly set into the operative state or non-operative state.

The voltage of the portion "a" gradually falls from the high level according to the time constant of a delay circuit configured by the resistor element R3 and capacitor C1 after the time point at which the control signal CNT2-1 changes to the high level. However, since the control signal CNT2-1 next changes to the low level, the voltage of the portion "a" changes to the high level corresponding to this change. Therefore, while the control signal CNT2-1 repeatedly rises and falls, the voltage of the portion "a" does not fall to the threshold voltage of the inverter IV1 and the voltage of the portion "c" is maintained at the high level. While the control signal CNT2-1 repeatedly rises and falls, the boosting unit 3-1 is in the operative state and performs one boosting operation or continuously execute the operations.

The voltage of the portion "b" gradually rises from the low level according to the time constant of a delay circuit configured by the resistor element R3 and capacitor C2 after the time point at which the control signal CNT2-1 changes to the low level. However, since the control signal CNT2-1 next changes to the high level, the voltage of the portion "b" changes to the low level corresponding to this change. Therefore, while the control signal CNT2-1 repeatedly rises and falls, the voltage of the portion "b" does not rise to the threshold voltage of the inverter IV3 and the voltage of the portion "d" is maintained at the high level.

The enable signal ENA2 stays at the low level as an initial state. Since the voltages of the portions "c", "d" are both at the high level, the voltage of the portions "e" stays at the high level. Therefore, the control signal CNT2-2 stays at the low level irrespective of the control signal CNT2-1. That is, the booster unit 3-2 is set in the non-operative state (inoperable state) in which the boosting operation is not performed irrespective of a variation in the control signal CNT2-1.

When the load current increases and the target voltage Vtarget cannot be maintained only by use of the booster unit 3-1 which is in the operative state and continuously performs the boosting operation, the control signal CNT2-1 stays at the high level, and therefore, the voltage of the portion "a" continuously falls. In this state, when a preset period of time (continuously operating time) has elapsed, the voltage of the portion "a" becomes lower than the threshold voltage Vth of the inverter IV1 and the voltage of the port-ion "c" and "e" change to the low level. The D-type flip-flop circuit 12 latches the state (high level) of the control signal CNT2-1 in response to input of the low level signal and outputs the enable signal ENA2 of high level. While the enable signal ENA2 stays at the high level, the booster unit 3-2 is in an operative state (operable state) in which a single or continuous operation is performed according to the control signal CNT2-1.

Next, when the load current decreases and the output voltage Vout continuously exceeds the target voltage Vtarget for more than a certain period of time, the control signal CNT2-1 stays at the low level. While the control signal CNT2-1 stays at the low level, the boosting unit 3-1 is in the non-operative state. With continued control signal CNT2-1 of the low level, the voltage of the portion "b" keeps rising. In this state, when a preset period of time (continuously non-operating time) has elapsed, the voltage of the portion "b" exceeds the threshold voltage Vth of the inverter IV3 and the voltages of the portions "d" and "e" change to the low level. The D-type flip-flop circuit 12 latches the state (low level) of the control signal CNT2-1 in response to input of the low level signal and outputs the enable signal ENA2 of low level. Thus, the booster unit 3-2 is set into the non-operative state.

Figure 12:
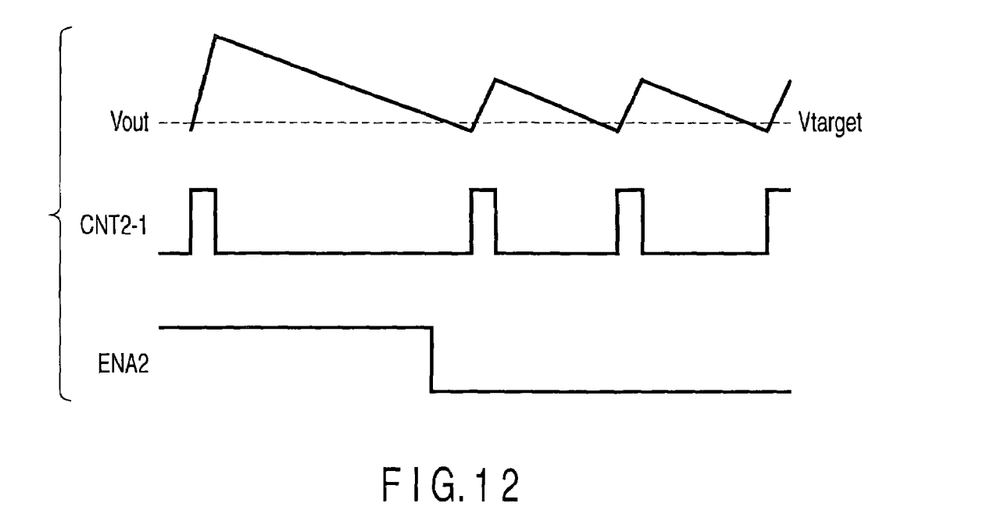
FIG. 12 is a diagram showing the relation between part of the timing chart of FIG. 11 and the output voltage.

Next, a variation in the output voltage of the booster circuit shown in FIGS. 9 and 10 which performs the above operation is explained. FIGS. 12 and 13 each show the relation between part of the timing chart of FIG. 11 and output voltage. As shown in FIG. 12, since the enable signal ENA2 is at the high level, the booster unit 3-2 is in the operative state. In this state, if the load current decreases, the output voltage Vout greatly exceeds the target voltage Vtarget and a variation in the output voltage Vout becomes larger since the boosting ability is excessively large. Therefore, the control signal CNT2-1 maintains the low level for a long time. The enable signal generation circuit 11-2 of FIG. 9 detects the above phenomenon and sets the enable signal ENA2 to the low level. As a result, since the booster unit 3-2 is set into the non-operative state and the boosting ability of the booster circuit 6 is lowered, a variation in the output voltage Vout is suppressed to a small value.

Figure 13:
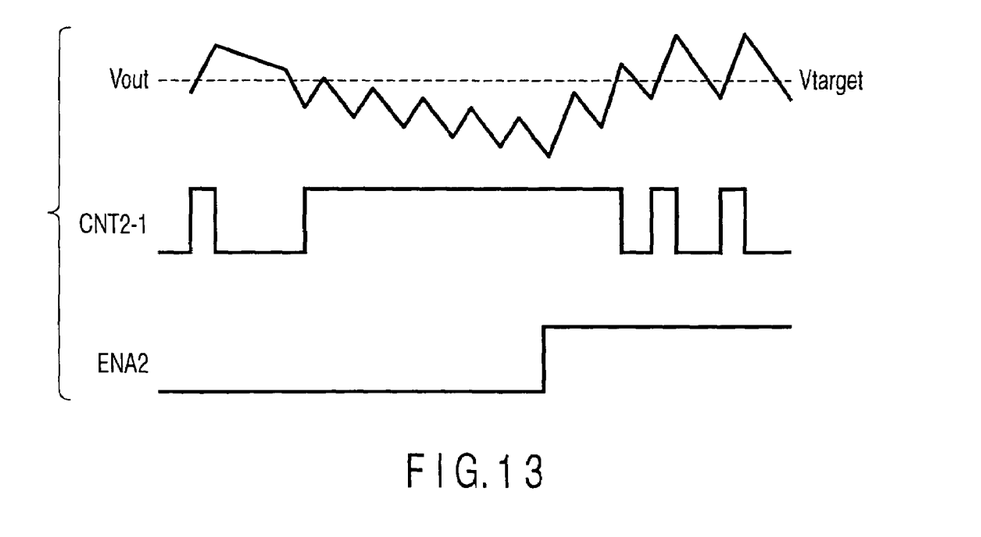
FIG. 13 is a diagram showing the relation between part of the timing chart of FIG. 11 and the output voltage.

As shown in FIG. 13, when the load current becomes larger while the enable signal ENA2 is at the low level, the operation of the booster unit 3-1 alone cannot keep the output voltage Vout at the target voltage Vtarget. Therefore, the control signal CNT2-1 stays at the high level. The enable signal generation circuit 11-2 detects that the control signal CNT2-1 stays at the high level for a preset period and outputs the enable signal ENA2 of high level. As a result, the booster unit 3-2 is set into the operative state and performs the boosting operation according to the control signal CNT2-1. Therefore, the output voltage Vout exceeds the target voltage Vtarget.

In the booster circuit according to the second embodiment of this invention, the two booster units 3-1, 3-2 which are connected in parallel transit between the operative state (operable state) and non-operative state (inoperable state) at different timings according to the output voltage Vout of the booster circuit 6. Therefore, like the first embodiment, transitions between the operative state and non-operative state of the booster units 3-1, 3-2 are controlled so as to operate the booster units 3-1, 3-2 in an optimum condition according to the value of the load current in the circuit which is supplied with the output voltage Vout. Thus, the same advantage as that of the first embodiment can be attained.

Figure 14:
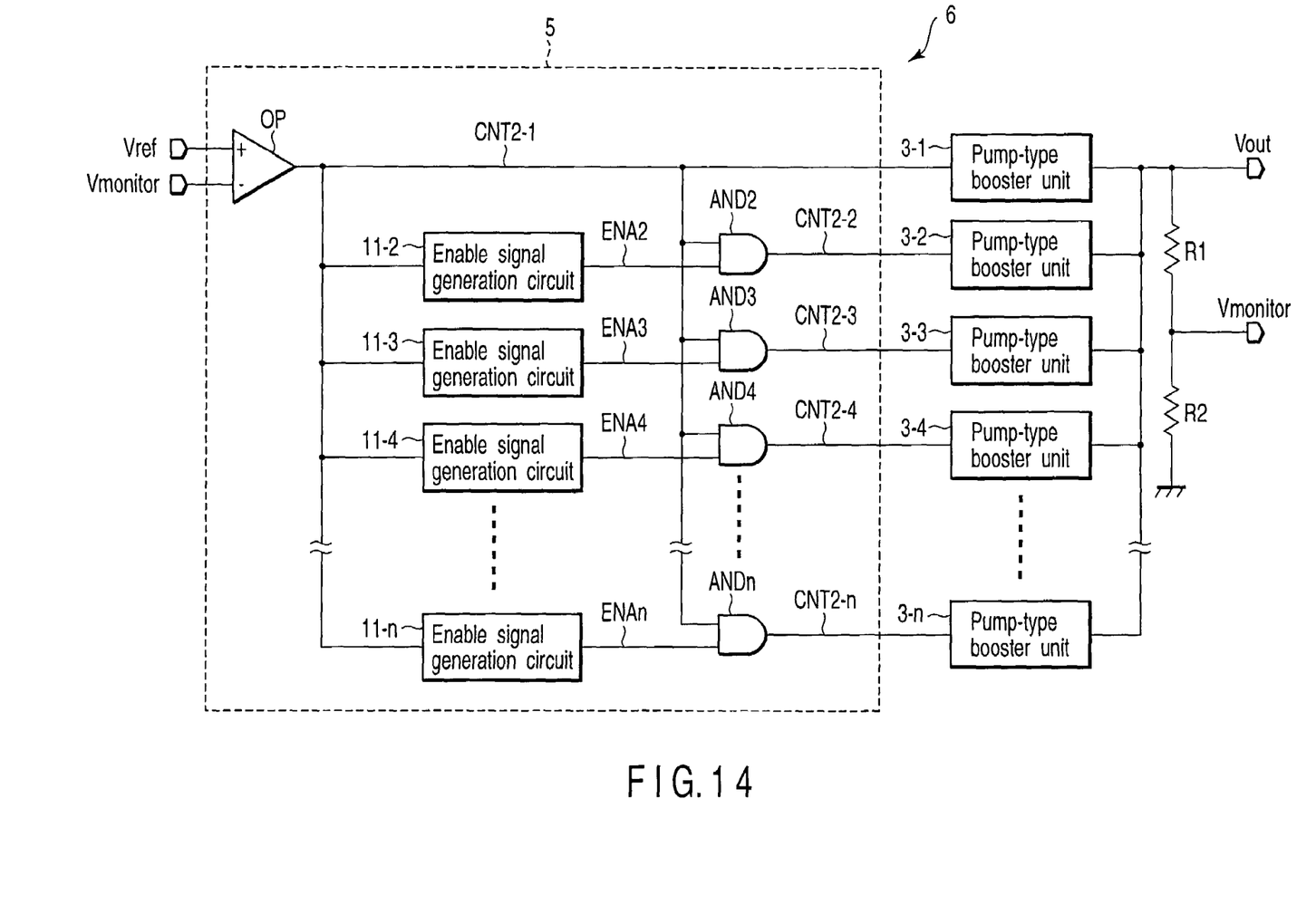
FIG. 14 is a diagram showing the main portion of a booster circuit according to a modification of the second embodiment of this invention.

Further, like the first embodiment, the configuration including three or more booster units can be used. FIG. 14 shows a case where n booster units are provided. As shown in FIG. 14, a control signal CNT2-1 is supplied to (n-1) enable signal generation circuits 11-2 to 11-n. The enable signal generation circuits 11-2 to 11-n respectively output enable signals ENA2 to ENAn for different preset period according to the control signal CNT2-1 staying at the high or low level. The enable signals ENA2 to ENAn are respectively supplied to one-side input terminals of AND circuits AND2 to ANDn. The other input terminals of the AND circuits AND2 to ANDn are supplied with the control signal CNT2-1. The AND circuits AND2 to ANDn respectively supply control signals CNT2-2 to CNT2-n to the booster units 3-2 to 3-n. The booster units 3-2 to 3-n perform the boosting operation according to input of the control signals CNT2-2 to CNT2-n of high level.

The circuit configuration of the enable signal generation circuits 11-2 to 11-n is the same as that shown in FIG. 10. However, values of the resistor element R3 and capacitors C1, C2 are so set that the states of the enable signals ENA2 to ENAn change at different timings. That is, for example, the values of the resistor element R3 and capacitors C1, C2 are determined so that the high level sustaining time (continuously operating time) of the control signal CNT2-1 required for changing the enable signals ENA2 to ENAn to the high level will become longer in the order from the enable signal generation circuits 11-2 to 11-n. On the other hand, the values of the resistor element R3 and capacitors C1, C2 are determined so that the low level sustaining time (continuously non-operating time) of the control signal CNT2-1 required for changing the enable signals ENA2 to ENAn to the low level will become shorter in the order from the enable signal generation circuits 11-2 to 11-n.

According to the configuration shown in FIG. 14, as the period of a state in which the output voltage Vout keeps lower than the target voltage Vtarget becomes longer, the booster units 3-2 to 3-n are sequentially and accumulatively set into the operative state in this order. Therefore, the output voltage Vout can exceed the target voltage Vtarget. On the other hand, as the period of a state in which the output voltage Vout stays higher than the target voltage Vtarget becomes longer, the booster units 3-n to 3-2 are sequentially and accumulatively set into the non-operative state in this order. Therefore, since the boosting ability of the booster circuit 6 is finely set according to the load current, a variation in the output current can be suppressed to a small value for the respective values of the load current.

The configuration can be made so as to operate two or more booster units in response to a certain control signal if three or more booster units are used. In this case, the number of sets of the enable signal generation circuits and AND circuits in the control section 5 is less than the total number of booster units—1. The number of sets of the enable signal generation circuits and AND circuits is at most the total number of booster units—1 since the set is unnecessary for the booster unit 3-1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A booster circuit comprising:
a first booster unit having a first output terminal from which a boosted voltage is output and that is connected to an external output terminal,
a second booster unit having a second output terminal from which a boosted voltage is output and that is connected to the external output terminal, and
a control circuit outputting a first control signal and a second control signal, the first control signal taking one of an on-specifying state for turning on the first booster unit and an off-specifying state for turning off the first booster unit based on a first value of an internal signal used as a threshold, the internal signal being related to the output voltage, the second control signal taking one of an on-specifying state for turning on the second booster unit and an off-specifying state for turning off the second booster unit based on a second value of the internal signal used as a threshold, the second value being lower than the first value.

2. The circuit according to claim 1, wherein the control circuit includes:
a differential amplifier circuit that is supplied with a signal related to the output voltage and a fixed reference voltage to generate the internal signal,
a first inverter circuit including a first p-type MOS transistor having a gate connected to a differential amplifier output terminal of the differential amplifier circuit and a first n-type MOS transistor serially connected to the first p-type MOS transistor, the first control signal being output from a connection node of the first p-type MOS transistor and the first n-type MOS transistor, and
a second inverter circuit including a second p-type MOS transistor having a gate connected to the differential amplifier output terminal and a second n-type MOS transistor serially connected to the second p-type MOS transistor, the second control signal being output from a connection node of the second p-type MOS transistor and the second n-type MOS transistor.

3. The circuit according to claim 2, wherein the first p-type MOS transistor has larger size than the second p-type MOS transistor.

4. The circuit according to claim 1, wherein the first value is a voltage of the internal signal that is obtained when the output voltage is a desired value.

5. The circuit according to claim 1, wherein the second booster unit is allowed to turn on and off while the first booster unit is kept ON.

6. A booster circuit comprising:
a first booster unit having a first output terminal from which a boosted voltage is output and that is connected to an external output terminal, a second booster unit having a second output terminal from which a boosted voltage is output and that is connected to the external output terminal, and a control circuit outputting a first control signal to turn on or off the first booster unit and a second control signal to turn on or off the second booster unit, the control circuit being allowed to output the second control signal after the first booster unit is kept ON for a first predetermined period, the control circuit being prohibited from outputting the second control signal after the first booster unit is kept OFF for a second predetermined period.

7. The circuit according to claim 6, wherein the control circuit includes a logic circuit which outputs the second control signal in an on-specifying state for turning on the second booster unit when the logic circuit is supplied with both the first control signal that is in an on-specifying state for turning on the first booster unit and an enable signal in an enable-specifying state.

8. The circuit according to claim 6, wherein the second booster unit turns on and off at substantially the same timing as the first booster unit.

9. The circuit according to claim 6, wherein the control circuit includes an enable signal generation circuit which keeps outputting the enable signal in the enable-specifying state after the first control signal stays in an on-specifying state for a first period, and keeps outputting the enable signal in a disable-specifying state after the first control signal stays in an off-specifying state for turning off the first booster unit for a second period.

10. The circuit according to claim 9, wherein the enable signal generation circuit includes an RC delay circuit which generates a delayed signal of the first control signal to determine the first period and the second period.

11. A booster circuit comprising:

first to n-th (n is a natural number not smaller than 2) booster units respectively having first to n-th output terminals from which boosted voltages are output, the first to n-th output terminals being connected to an external output terminal, and a control circuit outputting first to m-th (m is a natural number not smaller than 2 and not larger than n) control signals, each of the first to m-th control signals taking one of an on-specifying state and an off-specifying state, each of the first to n-th booster units receiving one of the first to m-th control signals, each of the first to n-th booster units turning on when receiving corresponding one of the first to m-th control signals in the on-specifying state and turning off when receiving corresponding one of the first to m-th control signals in the off-specifying state, each of the first to m-th control signals changing from and to the on-specifying state to and from the off-specifying state respectively based on first to m-th values of an internal signal as a threshold, the internal signal being related to the output voltage.

12. The circuit according to claim 11, wherein the control circuit includes a differential amplifier circuit that is supplied with a signal related to the output voltage and a fixed reference voltage to generate the internal signal and first to m-th inverter circuits, the first to m-th inverter circuits respectively include first to m-th p-type MOS transistors and first to m-th n-type MOS transistors which are respectively serially connected to the first to m-th p-type MOS transistors, gates of the first to m-th p-type MOS transistors are connected to a differential amplifier output terminal of the differential amplifier circuit, and the first to m-th control signals are output from respective connection nodes of the first to m-th p-type MOS transistors and the first to m-th n-type MOS transistors.

13. The circuit according to claim 12, wherein sizes of the first to m-th p-type MOS transistors are different from one another.

14. The circuit according to claim 11, wherein the second to n-th booster units are allowed to turn on and off while the first booster unit is kept ON.

15. A booster circuit comprising:

first to n-th (n is a natural number not smaller than 2) booster units respectively having first to n-th output terminals from which boosted voltages are output, the first to n-th output terminals being connected to an external output terminal, and a control circuit outputting first to m-th (m is a natural number not smaller than 2 and not larger than n) control signals, each of the first to m-th control signals taking one of an on-specifying state and an off-specifying state, each of the first to n-th booster units receiving one of the first to m-th control signals, each of the first to n-th booster units turning on when receiving corresponding one of the first to m-th control signals in the on-specifying state and turning off when receiving corresponding one of the first to m-th control signals in the off-specifying state, the control circuit being allowed to output i-th (i being 2 to m) control signal after the control circuit keeps outputting (i-1)-th control signal in the on-specifying state for a first predetermined period, the control circuit being prohibited from outputting i-th control signal after the control circuit keeps outputting (i-1)-th control signal in the off-specifying state for a second predetermined period.

16. The circuit according to claim 15, wherein the control circuit includes second to m-th logic circuits which respectively output the second to m-th control signals in the on-specifying state when the second to m-th logic circuits are supplied with the first control signal in the on-specifying state and respectively supplied with second to m-th enable signals at an enable-specifying state.

17. The circuit according to claim 15, wherein the second to n-th booster units turn on and off state at substantially the same timing as the first booster unit.

18. The circuit according to claim 15, wherein the control circuit includes second to m-th enable signal generation circuits, the second to m-th enable signal generation circuits respectively keep outputting the second to m-th enable signals in the enable-specifying state after the first control signal stays in the on-specifying state for second to m-th on period, respectively, the second to m-th enable signal generation circuits respectively keep outputting the second to m-th enable signals in an disable-specifying state after the first control signal stays in an off-specifying state for turning off the first booster unit for second to m-th off period.

* * * * *